PARAMETRIC DEVICE HAVING PUMP FIELD AND EASY AXIS DISPOSED AT AN ANGLE

Filed Jan. 9, 1961

INVENTOR
VIRGIL A. EHRESMAN

BY Cushman, Darby & Cushman
ATTORNEYS

OUTPUT AMPLITUDE vs. EASY AXIS ANGULAR DISPLACEMENT $H_C$ = 1.17oe., $H_K$ = 3.14oe.

⊙ CONSTANT PUMP-BIAS AND TUNING (BIAS 4.59oe.)

X SAME PUMP AND TUNING; BIAS INCREASED BY 0.81oe.

INVENTOR
VIRGIL A. EHRESMAN

BY
Cushman, Darby & Cushman
ATTORNEYS

United States Patent Office 3,445,674
Patented May 20, 1969

3,445,674

PARAMETRIC DEVICE HAVING PUMP FIELD AND EASY AXIS DISPOSED AT AN ANGLE

Virgil A. Ehresman, Richfield, Minn., assignor to Sperry Rand Corporation, New York, N.Y., a corporation of Delaware Filed Jan. 9, 1961, Ser. No. 81,360
Int. Cl. H01f 27/42, 31/06
U.S. Cl. 307—88 31 Claims This invention relates to parametric devices and methods for constructing and controlling the output of same.

In the last few years, considerable research has been done on parametric devices of numerous different types. The general history of parametric devices and their operation may be obtained from the Mumford article entitled "Some Notes on the History of Parametric Transducers" beginning on page 848 of the May 1960 Proceedings of IRE; and the "parametrons" (parametric oscillators) in particular, from the article by Onyshkevych et al. entitled "Parametric Phase-Locked Oscillator—Characteristics and Applications to Digital Systems" beginning on page 277 of the September 1959 issue of IRE Transactions on Electronic Computers. Reference is also made to the references of those articles, which of course include the first United States patent on parametrons: Von Newman 2,815,488. The instant application deals with parametric devices of the magnetic type, and more particularly of the magnetic film type. For a general background in parametric devices of the sort referred to in this application, reference is made to the copending application of Davis et al. Ser. No. 61,981, filed Oct. 11, 1960, as well as to the two papers respectively by Read et al. entitled, "Magnetic Film Parametric Amplifiers" and Pohm et al. entitled, "High Frequency Magnetic Film Parametrons for Computer Logic," both presented at the National Electronics Conference held Oct. 12–14, 1959, in Chicago, Ill.

For certain applications of parametric devices, it is desirable that the outputs of the devices be similar enough in amplitude to allow desired operation of, or cooperation between, the devices. This is true of parametric amplifiers in certain instances, as well as parametric oscillators. For example, in a computer which is designed to employ parametrons completely, as suggested for example in the article by Muroga et al. entitled "The Parametron Digital Computer Musasino-1" beginning on page 308 in the September 1959 issue of IRE Transactions on Electronic Computers (vol. EC–8, No. 3) it is desirable to be able to control, and have operating tolerances for, the numerous different parametron output amplitudes in order to effect reliable operation of the computer. To accomplish this requires assurance that output amplitudes will be in a desired amplitude range. The amplitude of the output is determined by the magnitude of the negative resistance effected by the device, all other variables being constant.

As later described in detail, the magnetic element of the parametric devices herein referred to is preferably an ultra "thin" film which has uniaxial anisotropy and a magnetization vector which is oscillatable in the plane of the film. By causing this magnetization vector to oscillate, negative resistance effects are noted across the output conductor of the device. This effects a gain and amplification for a parametric amplifier: plus oscillation, which soon reaches a steady state amplitude, for parametric oscillators.

It is one of the principal features and objects of the present invention to provide a magnetic type parametric device whose negative resistance output has a magnitude which is in a predetermined desired range of magnitudes.

In accordance with one embodiment of the present invention, the pump field and easy axis of the magnetic film are disposed at an angle which will cause the output of the device to be in a predetermined range of magnitudes, said angle being defined by one of the following: substantially a right angle, approximately within the range of from 5° to 55° in one direction from the pump field axis, approximately 10° to 75° in the other direction from the pump field axis; and it is one of the objects of this invention to effect such a disposition.

Another object of this invention is the provision of a method and resulting devices, of orienting the pump axis for each of the devices relative to the respective easy axes at such an angle that though all of the pump axes are parallel and at least some of the easy axes are angulated with respect to one another, the outputs of the devices are all within a desired magnitude range.

Still other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings wherein:

Figure 1:
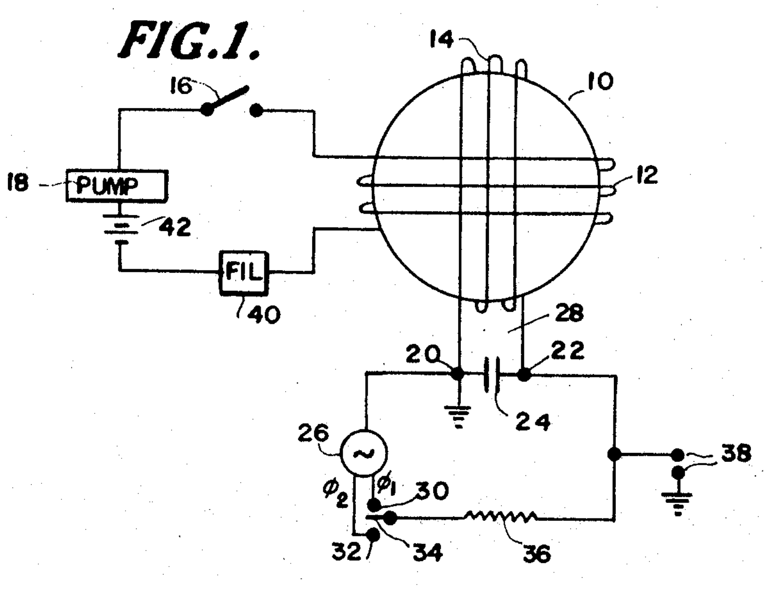
FIGURE 1 is an illustration of a parametric device constructed in accordance with this invention.

FIGURE 1 illustrates a parametric oscillator similar to the one shown in FIGURE 7 of the aforementioned Davis et al. application Ser. No. 61,981, and in general its operation is the same as therein described. It should be kept in mind, however, that in the present applicaion, the easy axis of the magnetic element 10 may be angulated with respect to the magnetic axis of the clock or pump winding 12, though it need not be for some embodiments of this invention. With the pump conductor or winding 12 being physically orientated horizontally in FIGURE 1, its magnetic axis, which is at right angles to its physical axis, is vertical in FIGURE 1. This places the magnetic axis of pump winding 12 substantially parallel to the physical axis of the output winding 14 whose magnetic axis, in turn, is substantially parallel to the physical axis of pump winding 12. Preferably, the input and output conductors 12 and 14 are transverse to each other, as at right angles to reduce as much as possible the air mutual coupling therebetween, though they need not be orthogonal unless desired. They should, however, cross each other.

When switch 16 is closed, the signal from the clock or pump source 18 causes a varying field to be applied by winding 12 along its field or magnetic axis. Since the magnetic element has a magnetization vector which is oscillatable, as explained in the aforementioned Davis et al. application, the field applied by winding 12 causes that magnetization vector to oscillate. This in turn effects a negative resistance across the output winding 14, for example as at terminals 20, 22.

Though this description proceeds in relation to a parametric oscillator which employs a condenser 24 connected across the output conductor or winding 14, it should be understood that the present invention is applicable also to parametric amplifiers of the sort disclosed in the aforementioned Davis et al. application. In such amplifiers, condenser 24 is not essential though it may be employed to effect a tuned parametric amplifier. In either case, for parametric amplification, source 26 provides the signal which is to be amplified by the gain effected due to the effective negative resistance caused at terminals 20, 22.

In the oscillator type of parametric devices, source 26 provides a signal which at least partially controls the phase of the oscillation produced in the tuned circuit 28 comprising winding 14 and condenser 24, all as indicated in the said Davis et al. application. That is, source 26 provides a signal at terminal 30 which is of phase $\phi_1$, and a signal at terminal 32 which is of phase $\phi_2$, with these two phases being substantially 180° apart. When either one of these two terminals is connected by switch 34 to apply the control signal, the oscillations in the output tank circuit 28 affect a signal across resistance 36 or at output terminals 38 which is of the same phase as the signal connected by switch 34. The oscillations are self-sustaining once initiated and accordingly, switch 34 need only be temporarily turned on, though it may be left on as long as desired. Source 26 and switch 34 may be another parametron providing its output as the phase-controlled input control signal for winding 14. Change in output phase may be accomplished as indicated in the above mentioned Davis et al. application, and as explained therein, a device as in FIGURE 1 of this present application provides a highly useful self-consistent digital computing element.

Filter 40 in FIGURE 1 may be employed if necessary or desirable to prevent the coupling back of any oscillation in tank circuit 28 to pump 18 or battery 42. The purpose of battery 42 is to apply a steady magnetic field to element 10 to bias it along a predetermined axis. This axis in the illustration of FIGURE 1 is the same axis as the magnetic axis of pump winding 12 since the biasing field and the varying field due to pump source 18 are both applied by the same winding. However, as indicated in the above mentioned Davis et al. application, the bias may be applied by a separate winding and may be in either of the two opposite directions along the magnetic axis of that winding. Additionally, the magnetic axis of the bias field need not coincide with the magnetic axis of the pump field, but the two may be angulated as desired.

Magnetic element 10, as above indicated, is characterized by a magnetization vector which is oscillatable. This is a requirement for the magnetic element, and such is present in numerous different magnetic materials. Preferably the magnetic element 10 is a magnetic film of the type which is normally referred to as "thin." That is, it may be of thickness ranging from a few A. units up to 10,000 A. for example. In any event, the film preferably has a single domain thickness. Further, the film is preferably single domain in its complete extent, except perhaps for whatever small parasitic domains it may have around its edges. Such a film may be prepared in accordance with the Rubens Patent 2,800,282, i.e. by vacuum deposition, with its preferable composition being 81% nickel, remainder iron. A metal film of this sort has uniaxial anisotropy, meaning that it has a single easy axis along which the magnetization of the film may be oriented in either of two opposite directions to effect two stable or residual magnetization states. Such a film also has a single "hard" axis of magnetization which is substantially orthogonal to the easy axis of the film. Isotropic films may also be used, as indicated in the aforementioned Davis et al. application.

Films of the sort described in the foregoing paragraph are preferable for this invention, though limitation thereto is not intended. In the said Davis et al. application, the easy axis of the film is substantially in alignment with the magnetization axis of the pump winding. It has been found by the present applicant, that if the easy axis is angulated with respect to the magnetization axis of the pump winding, the negative resistance effected at terminals 20, 22, and the resulting oscillations in tuned circuit 28, will be more uniform in magnitude from film to film. This is especially important when employing a plurality of parametric devices in any cooperative arrangement wherein the outputs thereof need to be within a tolerable desired range of magnitudes. That is, when it is desirable to have the outputs of a plurality of parametric oscillators for example, sufficiently uniform to operate cooperatively (for example as in the case above cited in reference to the Muroga article wherein a complete digital computer is made of parametrons) this invention can be employed with particular usefulness. It may also be usefully employed where parametric devices are to form any of the arrangements referred to in either of the Goto Patents 2,948,818 and 2,948,819; in the Schauer et al. article entitled, "Some Applications of Magnetic Film Parametrons as Logical Devices," in the September 1960 issue of IRE Transactions on Electronic Computers, beginning at page 315 (vol. EC–9, No. 3); in any of the other publications mentioned herein; or in the FIGURE 6 transmission line amplifier in the said Davis et al. application.

Figure 2:
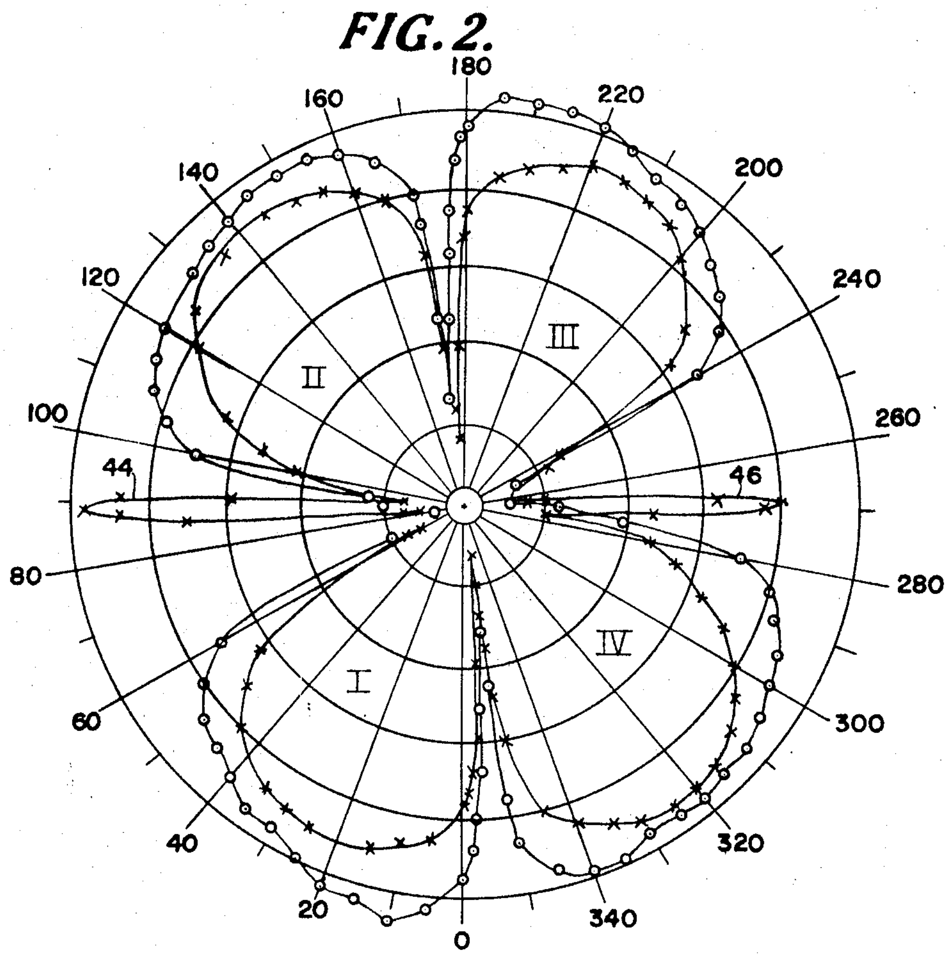
FIGURE 2 is a polar plot representing variations in output amplitude of a parametric device of the magnetic film type for variations in displacement of the easy axis of the film realtive to the pump field axis.

With the pump, bias, and control signal fields being applied as indicated in FIGURE 2, the polar graph shows the oscillation amplitude for two different bias values with the easy axis of the film in each of a plurality of positions relative to the pump field. When the easy axis is in alignment with the pump field, the 0° point indicates that the direction of magnetization of the film is downward in FIGURE 2, while the 180° point means that the residual magnetization is in the opposite stable state. Switching between the two states occurs at approximately the 90° and 270° points as the film is rotated with respect to the external fields. From the graph, it can be seen that with the lower bias value (4.59 oe.) the lobes in each of quadrants I, II, III, and IV have slightly larger amplitude and breadth than do the X'd lobes in the respective quadrants, these latter lobes being the result of the bias being increased to 5.40 oe. However, with the larger bias, when the easy axis of the film is approximately at right angles with the pump and bias fields, a substantial output is effected as shown by the narrow lobes 44 and 46 which respectively peak at about 89° and 269°, where as no such lobes appear at all with the lower bias. It is believed that lobes 44 and 46 occur with the higher rather than the lower bias because, as between the two, only the higher bias is sufficient to cause the magnetization of the film to be aligned therewith, so that the magnetization has a tendency to relax toward the easy axis in either angular direction equally giving rise to the desired parametric action.

It will be noted that in FIGURE 2 the nulls near the 0° and 180° line do not appear exactly thereon, but occur at a point approximately 6° measured in a counterclockwise direction, i.e. at approximately 174° and at approximately 354°. From these nulls, the lobes extend in both directions. The lobes in quadrants I and III reach a limit at approximately 65° and 240° respectively (both approximately 60° to 65° clockwise from the pump field axis), while the lobes in quadrants II and IV respectively reach a limit at approximately 95° and 275° (both about 85° counterclockwise from the pump field axis). Though the graph of FIGURE 2 contains a certain amount of asymmetry which is at present unexplainable, it is known that the outputs for a variety of bias conditions are suitable in magnitude when the easy axes are all displaced from their respective pump field axes in the angular range of from approximately −3° to +55 or 60° in one angular direction (clockwise) from the pump field axis, or about 10° to 75° in the other angular direction (counterclockwise) from the pump field axis.

The graph of FIGURE 2 was made with a film whose coercive force $H_C$ was substantially less than its anisotropy field $H_K$. As a matter of fact, the $H_K/H_C$ ratio was greater than 2 as may be gathered from the values given on the drawing. In another experiment involving numerous films, it was found that if the $H_K/H_C$ ratio was less than 2 and the $\theta_S$ film characteristic (which may be defined as the integrated flux resulting from switching the film from a residual magnetization state to the opposite state or flux saturation—in other words, the flux represented by the area to one side of the ordinate of the B–H characteristic curve) was less than 0.14 maxwell, a film gave a sufficient output over the widest arc of angular orientation including some reasonable operating tolerance.

The pump to bias fields ratio, if bias is used at all which it need not be for certain applications, is determined by the properties of the film being used. Firstly, it is desired that the film be kept as a single magnetic domain, i.e., that the magnetization behaves as a single vector. It is also desirable to have the pump field sufficiently strong with respect to the bias field to place the film in a state below the knee of the curve. If the bias field is too strong, the pump would be ineffective to oscillate the magnetization vector.

As above indicated, the magnetic film in the parametric devices of this application, may be the result of a deposition process such as that in the aforementioned Rubens patent. When a plurality of films are simultaneously deposited on to a single substrate, it is not always possible to have the easy axis of the respective films parallel with respect to each other. Dispersion of the easy axes is also not necessarily uniform. Consequently, when two or more of the films of the group or array so deposited are to be used together in any of the manners above indicated with the respective input (pump) and output windings being successively disposed on the films uniformly, for example as by any of the methods referred to in the Rubens et al. application Ser. No. 13,361, filed Mar. 7, 1960, now Patent No. 3,155,561, the outputs of the various films may not be within a desired amplitude range if the pump winding conductors are uniformly placed at right angles to the line on which the easy axis of each film should have been generated during deposition. Accordingly, the magnetic axis of the pump conductors is disposed for all films at an angle to the would-be easy axes. For example, if the pump conductor were disposed so that its magnetic axis would make an angle of approximately 25° with what should be the easy axis of all the films, then it is apparent from FIGURE 2 that operation could be in quadrant I or III with considerable latitude for variation between the actual angle of the respective easy axis and the pump field while still obtaining an output in a desired amplitude range. On the other hand, operation could be in quadrant II or IV, for example by placing the pump conductor so that the easy axes are all effectively rotated in the opposite direction from the pump field; that is, if the magnetic axis of the pump conductors were approximately 40° in the appropriate direction from what should be the easy axis of all films so as to effect operation in quadrants II and IV, it will be apparent that again a considerable amount of skewing between easy axes could still effect output amplitudes in a desirable range. By like token, if the magnetic axis of the pump conductors were approximately 90° from the easy axis, one of loops 44 and 46 would be effected, to again place the output amplitude within a predetermined desirable range of amplitudes. Mixtures of any of the useable angulations may be employed as desired.

Figure 3:
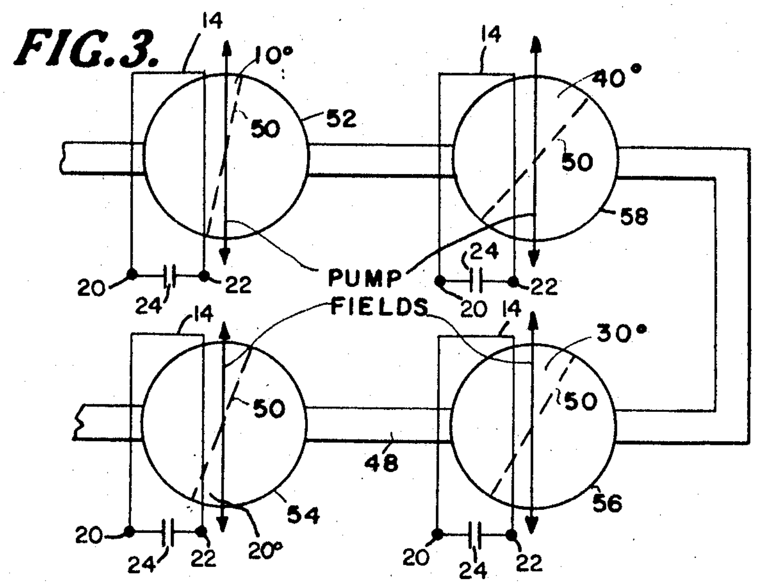
FIGURE 3 is a partial schematic showing of a plurality of parametric devices with easy axes skewed with respect to one another, while all pump field axes are parallel to one another.

As a matter of example of several films which might result from a single deposition process, reference may be made to FIGURE 3 in which four films are shown in a deposited 2 x 2 array, and the pump field is uniformly applied to the different films along parallelaxes, for example along the magnetic axes which pertain to the conductor 48. The signal or output windings 14 are identical to, and have the same operation as the winding illustrated in FIG. 1. The tank circuit formed by capacitors 24 also have the same operation as illustrated in FIG. 1. However, the easy axes 50 of these four films are not uniformly angulated with respect to the pump fields, but are skewed or oblique to one another. The angle between the pump field and easy axis of film 52 is represented as 10°; of film 54, 20°; film 56, 30°; and film 58, 40°. These variations in angulation of the easy axis with respect to one another are illustrative only and do not necessarily indicate that which would actually result from a deposition process. Since the pump fields in FIGURE 3 have an angular relationship with respect to the various easy axes 50 of from 10° to 40°, it is apparent that operation of these films in four different parametric oscillator arrangements similar to that in FIGURE 1 could produce four outputs all of which are within a desired range of amplitudes, whether operation be in quadrant I, II, III, or IV of FIGURE 2. This is intended to indicate one example of how the different lobes in FIGURE 2 which characterize different films present the opportunity to cause similar operation of various parametric devices even though the easy axes of the different films may be skewed with respect to one another.

As above indicated, the method of this invention may be carried out by appropriately disposing the easy axis and pump field axis of the different films appropriately, for example during successive evaporations or by manual disposition to obtain the output magnitude uniformity desired. Further, the method of the invention may be practiced by rotating any given film with respect to the remainder of the apparatus shown in FIGURE 1 so that the required angle and desired tolerance of magnitudes is obtained. In particular, the magnetic element may be adjusted so that its easy axis is in an angular relationship with the pump axis so that the magnitude of the negative resistance or oscillation amplitude is within a desired magnitude range. The preferred embodiment of an oscillator is such that the pump field frequency is twice that of the output signal obtained at terminals 38 in FIGURE 1. When operation is in this manner, the device is considered as a sub-harmonic, phase locked oscillator. Operation may be at any other desired frequency however. Once the frequency of operation is determined, the graph of FIGURE 2 may be made by rotating the film in steps and retuning the output tank circuit to the desired operation frequency at the beginning of each step in order to plot the output amplitude at that time. The rotation of the film with respect to the pump axis changes the film inductance seen by the output tank winding which in turn varies the frequency of operation of the output tank in a frequency modulation manner. Retuning of the output tank for each position on the plot of FIGURE 2 does not change the polar aspects thereof but extends the amplitude of the lobes. Operation with the output frequency at one-half the pump frequency is desired for maximum oscillation amplitude. For the plot of FIGURE 2, the output tank was tuned to approximately 25 mc. However, as indicated in the above mentioned Davis et al. application and in the Pohm et al. article entitled "Operation of Magnetic Film Parametrons in the 100–500-mc. Regions" beginning on page 119S in the May 1960 Supplement to vol. 31, No. 5, Journal of Applied Physics, operation of parametric oscillators may be at a much higher frequency than 25 mc.

Thus, it is apparent that there is provided by this invention a device in which the various objects and advantages herein set forth are successfully achieved.

Modifications of this invention not described herein will become apparent to those of ordinary skill in the art upon reading this disclosure. Therefore, it is intended that the material contained in the foregoing description and the accompanying drawings be interpreted as illustrative and not limitative, the scope of the invention being defined in the appended claims.

What is claimed is:

1. A parametric device comprising a magnetic element having a given easy axis and an oscillatable magnetization vector, and means including crossed input and output conductors coupled to said element for applying thereto a varying field via at least an input one of said conductors and along an axis oriented with respect to said easy axis at an angle predetermined to cause a desired magnitude of effective negative resistance to appear across an output one of said conductors when said vector oscillates due at least in part to said varying field.

2. A parametric device comprising a magnetic element having a predetermined easy axis and an oscillatable magnetization vector, conductor means coupled to said element and including two conductors disposed crosswise of each other, means coupled to said conductor means and comprising pumping means coupled to one of said conductors for applying a varying field to said element, for causing said vector to oscillate and effect a negative resistance across the other of said conductors, and means for constantly magnetically biasing said element along an axis angulated with respect to said easy axis, said varying field being applied substantially along said biasing axis with the angle between said biasing and easy axes being predetermined to regulate the magnitude of said negative resistance.

3. A parametric device comprising a magnetic element having a given easy axis and an oscillatable magnetization vector, and means including crossed conductors for applying to said element at least partially via at least one of said conductors a biased varying field at least part of which is along an axis oriented with respect to said easy axis at an angle predetermined to cause a desired magnitude of effective negative resistance to appear across a said conductor which crosses said one conductor when said vector oscillates due at least in part to said varying field.

4. A parametric device comprising a magnetic element having a given easy axis and an oscillatable magnetization vector, an output conductor inductively coupled to said element, and means including an input conductor disposed crosswise of said output conductor for applying to said element via at least said input conductor a varying field to cause said vector to oscillate and effect an effective negative resistance across said output conductor, the magnetic axis of said input conductor being oriented with respect to said easy axis at an angle predetermined to cause said negative resistance to be effected as aforesaid but at a magnitude which is in a desired range of magnitudes.

5. A device as in claim 4 wherein said angle is at least approximately a right angle.

6. A device as in claim 4 wherein said angle is in an angular range extending from 5° to no more than about 60°.

7. A device as in claim 4 wherein said angle is in an angular range in the lower limit of which is no less than 6° and the upper limit of which is approximately 85°.

8. A device as in claim 4 including means for applying a magnetic bias to said element.

9. A device as in claim 8 wherein said bias is applied substantially parallel to said magnetic axis.

10. A device as in claim 8 wherein said bias is applied substantially parallel to an axis which has relative to said easy axis an angular relationship defined by one of the following: approximately a right angle, an angle which is in the range of from 5° to about 60° in one angular direction from said magnetic axis, an angle which is in the range of about 6° to about 85° in the other angular direction from said magnetic axis.

11. A device as in claim 8 wherein said bias is steadily applied at an angle to said easy axis and is sufficient in magnitude to cause said vector to substantially align itself with the direction of said bias.

12. A device as in claim 8 wherein said bias is steadily applied at an angle to said easy axis but is insufficient in magnitude to cause said vector to substantially align itself with the direction of said bias.

13. A device as in claim 4 wherein said magnetic element is comprised of a single domain uniaxial anisotropic film and said vector oscillates in the plane of said film.

14. A device as in claim 13 wherein said film has a coercive force $H_C$ and an anisotropy field $H_K$ and its ratio $H_K/H_C$ is greater than two.

15. A device as in claim 13 wherein said film has a coercive force $H_C$ and an anisotropy field $H_K$ and its ratio $H_K/H_C$ is less than two.

16. A device as in claim 15 wherein said film has two residual magnetization states and two respectively associated flux saturation states plus a characteristic $\theta_S$ which is defined as the integrated flux resulting when the film is switched from one of said residual states to the flux saturation state associated with the other residual state, $\theta_S$ being less than 0.14 maxwell for said film.

17. A parametric device as in claim 4 including a condenser coupled across said output conductor.

18. A parametric oscillator comprising the device of claim 17 wherein said output conductor and condenser form a tank circuit and said negative resistance causes oscillations in said tank circuit, and means coupled to said device for controlling the phase of the tank circuit oscillations as between at least two different phases.

19. An oscillator as in claim 18 wherein said tank circuit is tuned to a frequency which is substantially one-half the frequency of said varying field.

20. A parametric device comprising a magnetic element having a given easy axis and an oscillatable magnetization vector, an input conductor inductively coupled to said element and oriented with its magnetic axis at least approximately at a right angle to said easy axis, an output conductor inductively coupled to said element and oriented with its magnetic axis crossing the said magnetic axis of said input conductor, and means including at least said input conductor for applying a varying field to said element in parallel with the magnetic axis of said input conductor for causing an effective negative resistance to appear across said output conductor when said vector oscillates due at least in part to said varying field.

21. A device as in claim 20 including means for biasing said magnetic element.

22. A device as in claim 21 wherein the biasing means effects a bias in a direction which is substantially parallel to the said magnetic axis of said input conductor.

23. A plurality of parametric devices each of which comprises a magnetic element having a respective given easy axis and an oscillatable magnetization vector, means for each element including a respective set of crossed conductors for applying to the respective element along a pump axis via a first of said conductors in the respective set a pumping field for causing an effective negative resistance to appear across a second of said conductors in the respective set when the respective said vector oscillates due at least, in part, to the said respective pumping field, the pump axes of at least two of said devices being different in their angular relationship relative to the respective easy axes with the said angular relationship for each of at least the said two devices being such as to cause the magnitude of the respective said negative resistances therefor to both be within a desired range.

24. A plurality of parametric devices as in claim 23 wherein the said angular relationship for each of at least the said two devices is defined by one of the following: approximately a right tngle, an angle which is within a first angular range of from about −6° to about +65° (including 0°) in one angular direction from the respective pump axis, an angle which is within a second angular range of from about +6° to about +85° in the other angular direction from the respective pump axis.

25. A plurality of devices as in claim 24 wherein said first angular range extends from about −3° to about +55° and said second angular range extends from about 10° to about 75°.

26. A group of parametric devices comprising a plurality of magnetic elements each of which has a given easy axis and an oscillatable magnetization vector, at least some of said axes being skewed with respect to each other, a plurality of output conductors respectively for said elements, means for applying a plurality of varying magnetic fields respectively to said elements along respective field axes all of which are substantially parallel to one another and respectively crosswise to the magnetic axes of said conductors, for respectively causing all said vectors to oscillate and effect across their respective output conductors effective negative resistances which all have a magnitude within a desired range of magnitudes.

27. A group of devices as in claim 26 wherein each of said field axes is substantially at a right angle to the respective output conductor's magnetic axis.

28. A group of parametric oscillators respectively comprising said devices of claim 26 each of which further includes a respective condenser coupled across its said output conductor to form a tank circuit in which oscillations are produced when the respective negative resistance is effected as aforesaid, the steady state oscillations of all said tank circuits having an amplitude which is in a predetermined desired amplitude range, and means for controlling the oscillations of at least some of said tank circuits at least as to in which of at least two different phases their oscillations occur.

29. A method for controlling the output of a parametric device of the type which has a magnetic element with a predetermined easy axis and an oscillatable magnetization vector and means including a varying field input conductor for causing said vector to oscillate and effect an effective negative resistance across an output conductor inductively coupled to said element and crossing said input conductor, said method comprising relatively disposing said element and input conductor to effect between said easy axis and the magnetic axis of said input conductor any one of a plurality of angular relationships which cause said negative resistance to appear as aforesaid but invariably with magnitude which are all in a predetermined desired magnitude range.

30. A method as in claim 29 wherein said disposing is such as to effect between the said easy and magnetic axes an angular relationship which is defined by one of the following: at least approximately a right angle, an angle which is between $-6°$ and about $+65°$ in one angular direction from the said magnetic axis, an angle which is between about $+6°$ and about $+85°$ in the opposite angular direction from the said magnetic axis.

31. A method for setting at desired values the amplitude and frequency of the output of a parametric device of the type which has a magnetic element with a predetermined easy axis and an oscillatable magnetization vector and means for causing said vector to oscillate and effect oscillations in an output tank circuit inductively coupled to said element, said method comprising alternately tuning said tank circuit to a desired frequency of oscillation and adjusting the angular position of said easy axis relative to at least a part of said means until the tank circuit oscillations have a desired amplitude at said desired frequency.

References Cited

UNITED STATES PATENTS 3,361,913 1/1968 Kaufman ------------ 307—88

OTHER REFERENCES

Proceedings of the National Electronics Conference, 1959, pages 65–78.

IBM Technical Disclosure Bulletin, April 1960, vol. 2, No. 6, pages 117–118.

IRE Transactions on Electronic Computers, September 1959, pages 277–286.

STANLEY M. URYNOWICZ, Jr., *Primary Examiner.*

U.S. Cl. X.R.

330—4.5